United States Patent [19]

McClure

[11] 4,452,263

[45] Jun. 5, 1984

[54] CART WASHING AND SANITIZING APPARATUS

[75] Inventor: Delmar H. McClure, Portland, Oreg.

[73] Assignee: McClure Plastics Company Incorporated, Portland, Oreg.

[21] Appl. No.: 393,093

[22] Filed: Jun. 28, 1982

[51] Int. Cl.[3] .......................... B08B 3/02; B08B 9/08; B60S 3/04

[52] U.S. Cl. ...................................... 134/45; 134/152; 134/200

[58] Field of Search .................. 134/45, 123, 152, 200

[56] References Cited

U.S. PATENT DOCUMENTS 3,444,867 5/1969 Thornton ............................ 134/123

3,736,948 6/1973 Crosswhite .......................... 134/123

*Primary Examiner*—Robert L. Bleutge

*Attorney, Agent, or Firm*—Kolisch, Hartwell, Dickinson & Anderson

[57] ABSTRACT

Apparatus for washing a delivery cart of the type having an open side. The apparatus includes a chamber and a floor-mounted platform defining a chamber washing station. A pair of side-by-side, vertically disposed spray booms are mounted within the chamber for swinging movement adjacent the open side of the cart positioned at the washing station. A drive system in the apparatus is operable to produce coordinated oscillation of the two booms, to direct pressurized wash water therefrom against substantially the entire inner cart surfaces to be washed. A rotary spray boom mounted in the chamber for rotation about the washing station is operable through another drive system to direct pressurized wash water against substantially the entire outer surface of the cart. The cart is discharged from the chamber, after washing, by a gravity-assisted off-feed device.

8 Claims, 5 Drawing Figures

CART WASHING AND SANITIZING APPARATUS

BACKGROUND AND SUMMARY

The present invention relates to apparatus for washing and sanitizing delivery carts, particularly a cart of the type having an open side.

Wheeled delivery carts are widely used in hospitals and other institutional settings for transporting food, supplies and the like. Typically, the carts are cleaned and sanitized with each use to prevent contamination of the transported articles and to minimize the risk of infection to those handling the carts.

Heretofore, apparatus for washing and sanitizing hospital or other institutional-use carts have been proposed. An apparatus designed specifically for washing delivery carts of the type having an open top and an upper cut-out portion formed in one side of the cart is disclosed in U.S. Pat. No. 3,736,948. The apparatus of that invention includes a chamber having a sealable-door entrance facing an infeed side of the chamber, and a sealable-door exit facing the chamber's outfeed side. A cart is moved through to the chamber, from the infeed to the outfeed side thereof, on a track which defines a central washing station within the chamber. A rotary washing device suspended from the ceiling of the chamber includes an outer spray boom which extends vertically along the outside of a cart positioned at the washing station, to spray pressurized wash water from the boom against the outside surface of the cart. A second, swinging boom in the washing device is mounted adjacent the rotational axis of the device for swinging between a raised horizontal position extending above the cart, downwardly through the cart's cut-out portion toward a vertical position, where the spray boom is adapted to spray pressurized wash water against the inside surface of the cart. As the washing device is rotated, pressurized spray from the two spray booms directed against opposed inner and outer cart surfaces effects complete cart washing.

It is common in hospitals and other institutions to use, in addition to the open-top cart of the type described above, a delivery cart of the type having a closed top, and an open side providing access to shelves in the cart. This type of cart cannot be washed by the swinging boom device described above.

One object of the present invention, therefore, is to provide a washing apparatus constructed for washing a delivery cart of the type having a closed top and an open side.

Another object of the invention is to provide such an apparatus which is also constructed for washing, in another mode in the apparatus an open-top delivery cart of the type described above.

It is yet another object of the invention to provide such an apparatus which is easily operated in one of two semiautomatic of fully automatic modes.

An additional object of the invention to provide a washing apparatus which is operable to discharge a washed cart by a gravity-assisted off-feed mechanism.

The apparatus of the present invention is intended for use in washing a delivery cart of the type having an open side. The apparatus includes a chamber adapted to receive a cart at a washing station defined within the chamber. A first spray structure mounted within the chamber of oscillatory movement adjacent the open side of a cart is supplied pressurized wash water to produce a wash water spray directed toward the cart's open side. The spray structure is driven in an oscillatory fashion adapted to direct the water spray against substantially the entire inner cart surfaces to be washed. A second spray structure is mounted within the chamber for movement substantially completely encircling a cart at the station, wherein a pressurized water spray from the boom is directed against substantially the entire outer side cart surfaces.

In a preferred embodiment of the invention, the first spray structure includes a pair of spray booms mounted for oscillatory swinging movement about a pair of spaced vertical axes, and the second spray structure includes a spray boom mounted for rotational movement about the washing station.

These and other objects and features of the present invention will become more fully apparent when the following detailed description of a preferred embodiment of the invention is read in conjunction with the accompanying drawings.

DETAILED DESCRIPTION OF A PREFERRED EMBODIMENT OF THE INVENTION

Figure 2:
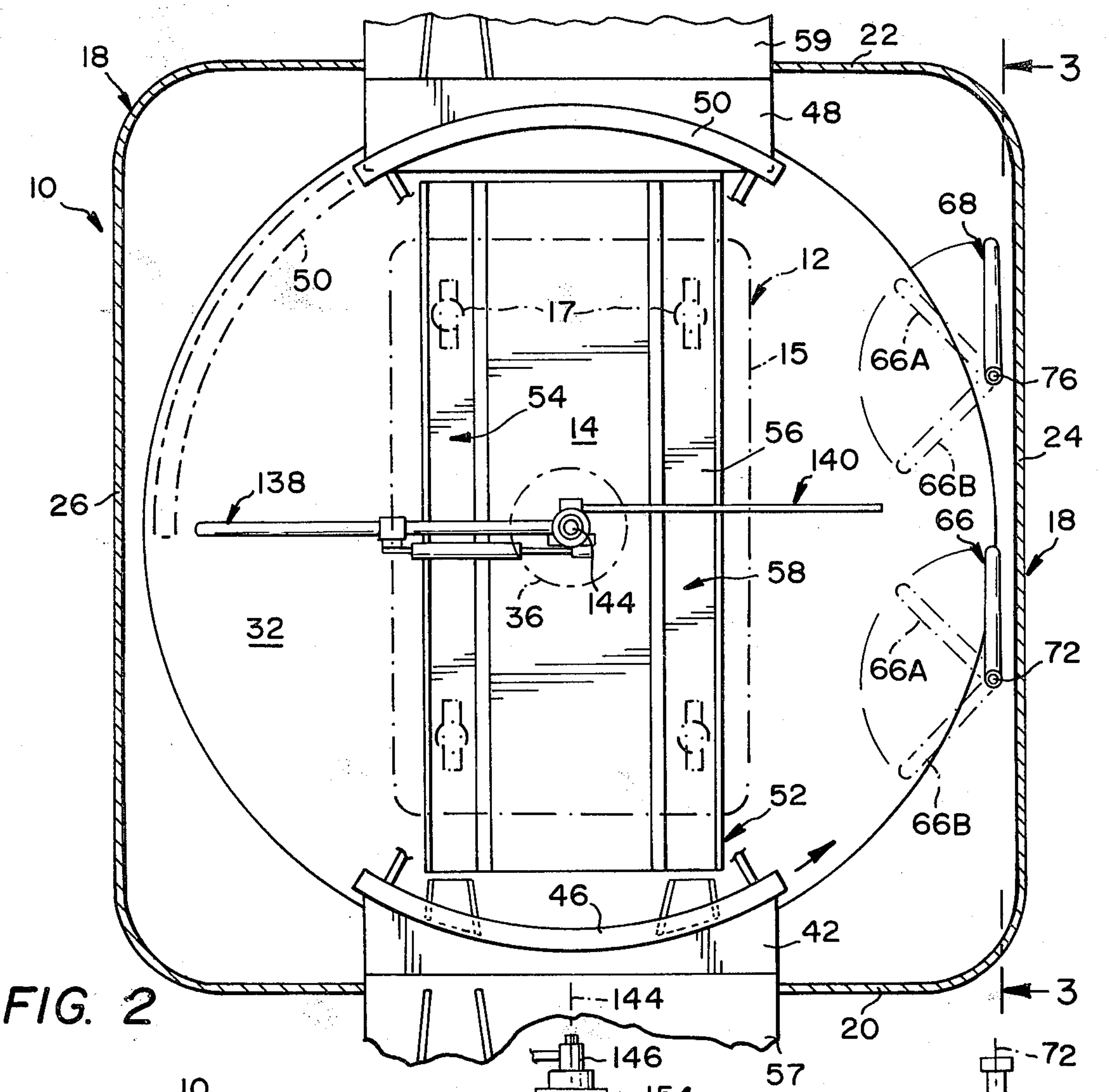
FIG. 2 is a top plan view of the apparatus, taken along line 2—2 in FIG. 1, also showing the apparatus in simplified form.
Figure 1:
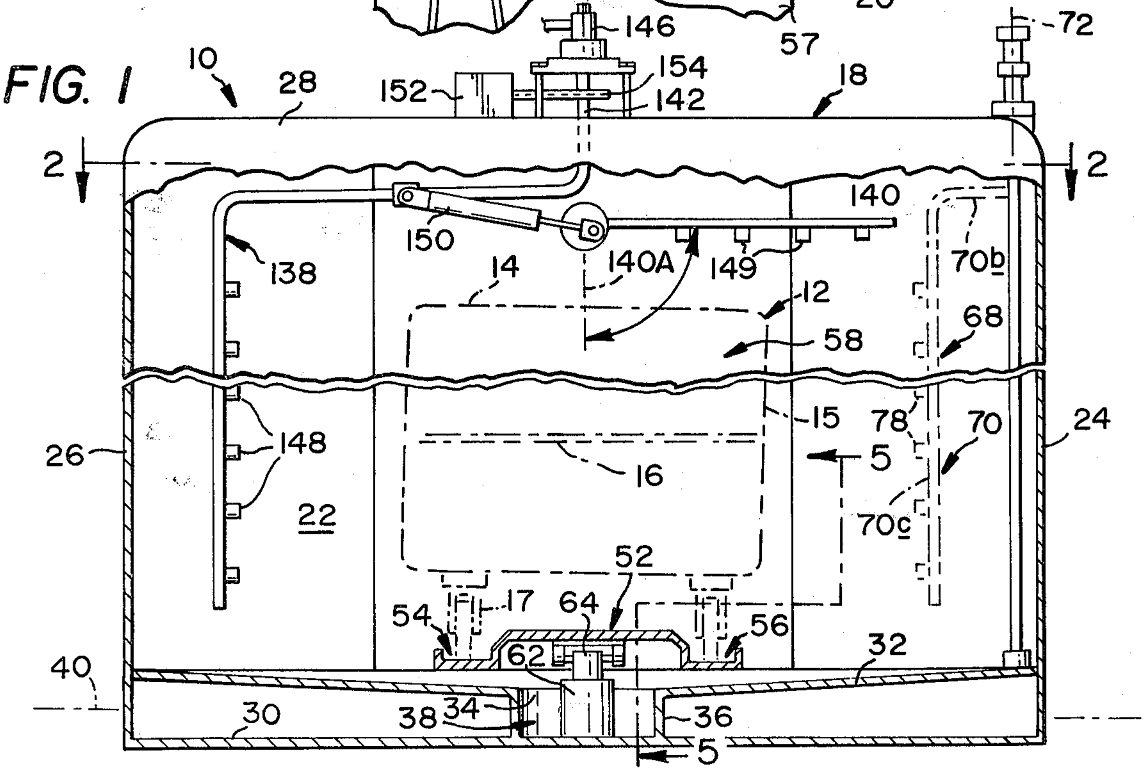
FIG. 1 is a somewhat simplified view of washing apparatus constructed according to the present invention, as viewed from the side in which a cart enters the apparatus, with portions of the apparatus below line 2—2 in the figure shown along a sectional line located substantially midway between the front and back sides of the apparatus.

Referring now to the drawings, and first particularly to FIGS. 1 and 2, there is shown generally at 10 a cart washing apparatus constructed according to the present invention. The invention is constructed particularly for washing a delivery cart, such as the one shown at 12 in dashed-dot lines in FIGS. 1, 2 and 5, having a closed top 14, and a single open side 15 providing access to one or more shelves, such as shelf 16 (FIG. 1). The cart is supported for rolling movement on caster-type wheels, such as wheels 17. This type of delivery cart is used in hospitals and extended-care institutions for transporting laundry, food, surgical tools and the like to and from supply stations.

The apparatus of the invention is also constructed for washing a delivery cart of the type having an open top and an upper cut-out portion formed in one side of the cart, and communicating with the open top. This type of cart is used typically for laundry delivery in an institutional setting. The features in apparatus 10 employed in washing and sanitizing this type of open-top delivery cart have been detailed in U.S. Pat. No. 3,736,948 and will be described herein only briefly.

Figure 5:
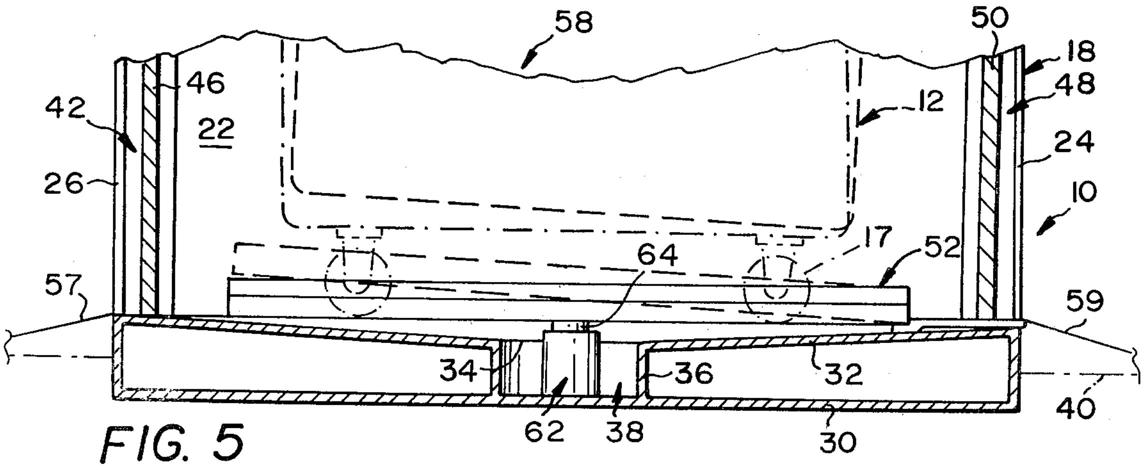
FIG. 5 is a sectional view taken generally along line 5—5 in FIG. 1, illustrating a cart-discharge mechanism in the apparatus.

With continued reference to FIGS. 1 and 2, apparatus 10 includes a substantially box-shaped housing, or chamber 18, having a front, cart-entrance sidewall 20 and a rear, cart-exit sidewall 22. These two sidewalls are formed integrally with a pair of opposed sidewalls 24, 26 seen in FIG. 2. The upper edges of the four chamber walls are joined to a ceiling 28 (FIGS. 1 and 3) to seal the upper portion of the chamber. The bottom edges of the four chamber walls are joined to a plate 30 supported on the ground. A floor 32 in the chamber has a cental opening 34 which is joined, as by welding, to a cylindrical sleeve 36 which supports the central portion of the floor above plate 30, as seen in FIGS. 1 and 5. The outer four edges of floor 32 are bolted and sealed to associated lower side regions of the four chamber walls. Floor 32 has a frustoconical taper progressing from its outer edges toward opening 34, promoting water drainage toward a center well 38 defined by sleeve 36. In a typical installation, the apparatus is set somewhat below the floor level of a room, as seen in FIGS. 1 and 5, where the floor level is indicated by dashed-dot lines at 40. Well 38 is drained by suitable plumbing (not shown) installed in the floor of the room.

Cart access into chamber 18 is provided by an entrance 42 (FIG. 2) formed in sidewall 20. A door 46 having the arcuate, end-on curvature seen in FIG. 2 is mounted on an arcuate track (not shown) suspended from ceiling 28 for arcuate travel between the closed position shown in FIG. 2, where the door functions to close and seal entrance 42, counterclockwise in FIG. 2 to an open position permitting cart passage through the entrance. Movement of the door between its open and closed positions is controlled by a ram (not shown). A cart exit 48 formed in wall 22 is similarly sealed by a door 50 which is shiftable, under the control of a ram (not shown) between a closed, exit-sealing position (shown in solid lines in FIG. 2) and an open position (shown in dashed-dot lines in this figure). U.S. Pat. No. 3,736,948 provides details of the construction of the chamber doors and of the structure used in mounting and shifting the doors.

A delivery cart, such as cart 12, is received in chamber 18 on an elongate platform 52 which extends substantially between the chamber's entrance and exit, as seen in FIG. 2. The platform has a pair of parallel, longitudinally extending wheelguide tracks 54, 56 (FIGS. 1 and 2) for guiding the cart through the chamber in an entrance-to-exit direction. The tracks may be constructed to produce a slight tilt in cart 12, seen in FIG. 1, toward its open side to promote wash water drainage in the cart. Entrance and exit ramps 57, 59, respectively, are used in guiding the cart onto and off of the platform in the chamber, respectively (FIGS. 2 and 5).

Platform 52 defines a central washing station 58 where the cart is positioned substantially midway between the chamber's entrance and exit, and substantially midway between chamber walls 24, 26 as shown for cart 12 in FIG. 2. The cart's open side 15 faces the central region of wall 24 with the cart at the washing station, as seen in FIG. 2.

Looking at FIG. 5, a pneumatic ram 62 mounted in well 38 has a piston 64 which is extendible, upon supply of pressurized air to the ram, from a retracted to an extended position. The upper end of the piston is attached to a lower central region of the platform in a manner allowing longitudinal rocking of the platform about the piston.

With the ram in its retracted position, shown in FIGS. 1 and 5, platform 52 is held in a substantially horizontal position, with its front and back ends each supported on chamber floor 32. When ram 62 is extended, the platform pivots about its right end in FIG. 5, raising the platform's left end off the floor to place the platform in an inclined position shown by dashed lines in FIG. 5. The inclined platform produces gravity-assisted off-feed of a cart from the washing station through exit 48, down ramp 59 and onto the floor of an off-feed region in the room in which the apparatus is housed. Ram 62 is also referred to herein as platform-raising means.

Apparatus 10 includes a pair of spray booms 66, 68 (FIGS. 2-4) used in washing the interior surface regions of cart 12. Boom 66, which is representative, is composed of a hollow tubular structure 70 (FIG. 3) having an upper vertically disposed segment 70*a*, a horizontally extending segment 70*b*, and a lower, vertically disposed segment 70*c* whose vertical dimension in relation to chamber 18 can be seen in FIG. 1. Structure 70 is journaled by a bearing 71 (FIG. 3) on the chamber ceiling for swinging movement about the axis of upper segment 70*a*, indicated by dashed-dot line 72 in FIGS. 1 and 2. Similarly, boom 68 includes a tubular structure 74 (FIG. 3) for swinging about the structure's upper end segment axis, indicated by dashed-dot line 76 in FIG. 3. The lower vertically disposed segment in each boom structure is provided with a plurality of vertically spaced spray nozzles, such as nozzles 78 in structure 70 (FIG. 1) which are constructed and arranged to form a substantially vertically continuous wash water spray directable against and spanning the cart's open side. Booms 66, 68 are also referred to herein collectively as first nozzle means.

Figure 3:
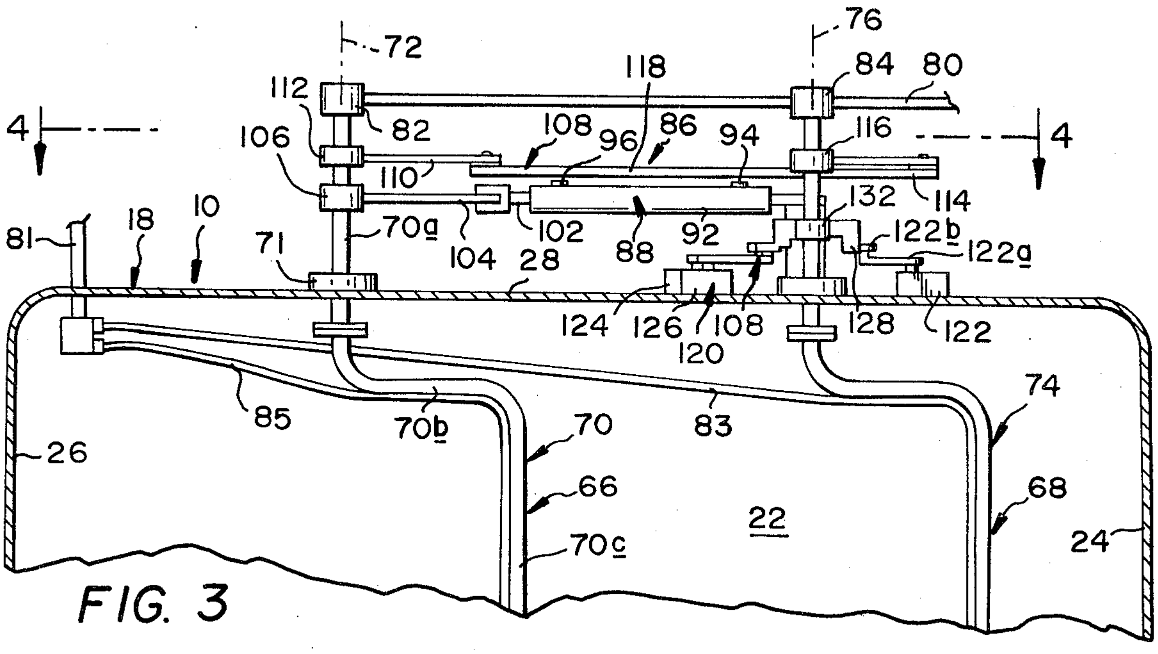
FIG. 3 is a sectional view, taken generally along line 3—3 in FIG. 2, of basic components of the system used in driving and supplying wash water to a pair of swinging spray booms in the apparatus.

Referring to FIG. 3, pressurized wash water is supplied to the two spray booms through a pipe 80 connected to a conventional source of pressurized wash water (not shown) which preferably is contained in a separate unit in the apparatus located next to chamber 18. Pipe 80 is connected to the booms through a pair of rotary fluid couplings 82, 84. Each coupling, such as coupling 82, may include a mixing chamber for mixing pressurized wash water with another solution, such as a germicidal solution supplied to the coupling through a separate supply system (not shown). Details of a coupling having such fluid mixing capability are described in above-referenced U.S. Pat. No. 3,736,948. The rate of supply of pressurized wash water to the two booms is such that the spray produced by the booms is directable against the rear interior surfaces of cart 12, i.e. the interior regions of the cart opposite its open face. Pipe 80 and the two couplings communicating the pipe with associated spray booms are also referred to herein as means for supplying pressurized wash water to the two booms.

Each boom is also provided with a plurality of air nozzles (not shown) disposed adjacent the water nozzles. The air nozzles are supplied compressed air through a flexible hose 85 in boom 66 and hose 83 in boom 68, connected to a suitable air supply source (not shown) through a hose 81.

Figure 4:
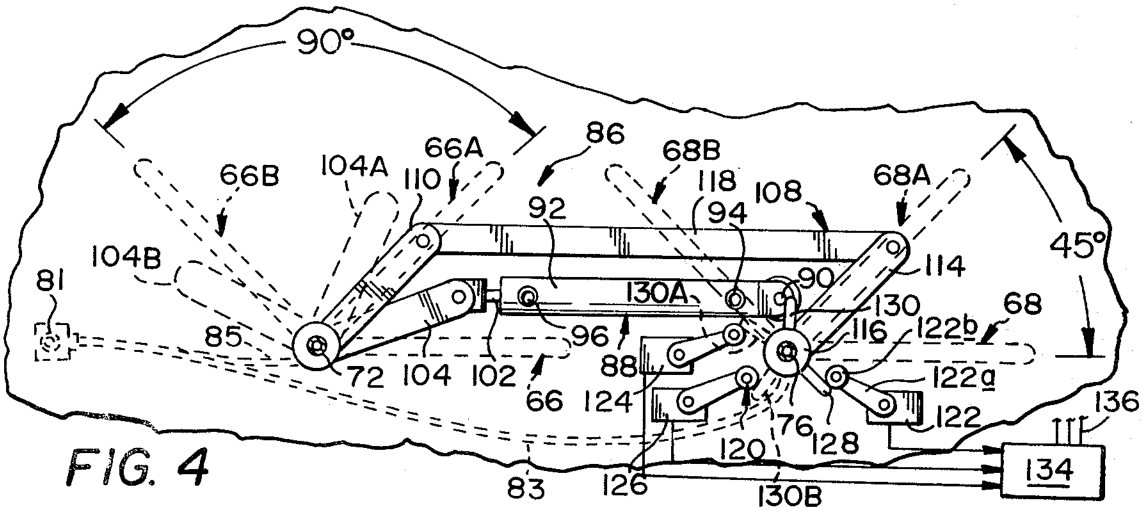
FIG. 4 is a top view of the system taken generally along line 4—4 in FIG. 3.

FIGS. 3 and 4 illustrate a drive system, indicated generally at 86, operable to produce coordinated oscillatory swinging movement in the two spray booms. The system includes a pneumatic ram 88 whose right end in the two figures is pivotally mounted on the chamber ceiling at 90 (FIG. 4) for pivoting about an upright axis. A cylinder 92 in the ram is provided with upstream and downstream ports 94, 96, respectively, through which pressurized air is supplied to the ram via suitable air-supply hoses (not shown). These hoses are connected to a source of pressurized gas through a conventional valving device (not shown). A piston rod 102 in the ram is shiftable, upon the supply of pressurized air to port 94, from the retracted position shown in FIGS. 3 and 4, to an extended position, and is retractable upon the supply of pressurized air through port 96.

The left end of the piston rod in the figures is pivotally connected to an arm 104 which is rigidly mounted on the upper segment in boom 66 through a sleeve connector 106 (FIG. 3). It can be appreciated in FIG. 4 that as piston rod 102 is extended, arm 104 is moved first toward a position indicated by dashed lines at 104A this movement being accommodated by swinging of ram 88 in a clockwise direction in the figure about connection 90. Continued extension of the piston is effective to move arm 104 toward the position shown in dashed lines at 104B, where this arm movement is accommodated by swinging of ram 88 in a counterclockwise direction in the figure.

The two spray booms are coupled for coordinated swinging movement by an arm assembly 108 also seen in FIGS. 3 and 4. The assembly includes a torque arm 110 rigidly mounted on the upper segment of boom 66 by a sleeve member 112, and a second arm 114 rigidly mounted on the upper segment of boom 68 by a sleeve member 116. Arms 110, 114 are pivotally connected at their distal ends by a tie bar 118, thus coupling ram-produced swinging of arm 110 with arm 114. Ram 88, arm 104 through which the ram is operatively connected to boom 66, and assembly 108 operatively connecting the two booms are also referred to herein, collectively, as first drive means.

A position-sensing assembly indicated gnerally at 120 in FIGS. 3 and 4, functions to monitor the rotational position of boom 68. The assembly includes three microswitches 122, 124, and 126 which are arranged about axis 76 on the chamber ceiling as shown in FIG. 4. The switches have associated switch arms, such as arm 122*a*, each of which terminates at a roller wheel, such as wheel 122*b*. A pair of rigid, switch-activating arms 128, 130 in assembly 120 are formed with a sleeve 132 which encircles the upper segment of boom 68 for rotation therewith. Viewing FIG. 4 particularly, arm 128 is constructed to contact the roller in switch 122, and arm 130 is constructed to contact the rollers in switches 124, 126, as the arms move past associated rollers in either a clockwise or counterclockwise direction, to produce a monitored switching event in the associated switches.

The three switches input an electronic control unit 134 (FIG. 4) which monitors and keeps track of the switching events occurring in the three switches. The control unit has one or more outputs, such as output 136 which are connected to suitable signal-responsive valves in the above-mentioned valving device controlling the supply of pressurized air to ram 88. Switch assembly 120 and unit 134 which receives switch-event information from the switches therein to control the swinging movement of booms 66, 68 through the supply of pressurized gas to ram 88, are also referred to herein collectively as first control means.

Referring again to FIGS. 1 and 2, apparatus 10 further includes a second pair of spray booms 138, 140, the construction and operation of which is detailed in above-cited U.S. Pat. No. 3,736,948. Briefly, the two booms are carried on an upright tubular segment 142 (FIG. 1) which is mounted centrally on the chamber ceiling for rotation about the segment's vertical axis, indicated by dashed-dot line 144 in FIG. 1. Pressurized wash water from the above-mentioned pressurized water source is supplied through a rotary coupling 146 to segment 142, and through this segment to the two booms where the water is ejected from linear arrays of nozzles on the two booms. The nozzles, such as nozzles 148, on boom 138 function to produce a substantially vertically continuous water spray directed against the outer side surface of a cart at the washing station, substantially spanning the cart top-to-bottom. Boom 138 is also referred to herein as second nozzle means, which may include boom 140 as well. Coupling 146 is also referred to herein as means for supplying pressurized wash water to the second nozzle means.

A ram 150 operatively interposed between booms 138, 140 is selectively operable to shift boom 140 from its raised, horizontally disposed position shown in FIGS. 1 and 2 to a lowered, vertically disposed position indicated by dashed-dot line 140A in FIG. 1. Operationally, boom 140 is lowered, under the action of ram 150, to place the boom in the interior of an open-top cart of the type having an upper cut-out portion through which the boom passes in swinging between its raised and lowered positions. As will be seen below, when apparatus 10 is used in washing an open-side cart, such as cart 12, boom 140 is maintained at all times in its raised, horizontally disposed position.

A motor 152 (FIG. 1) mounted on the chamber ceiling is drivingly coupled to segment 142 by a drive chain 154. The motor is operable to rotate segment 142 and booms 138, 140 carried thereon about axis 144. Motor 152, which is also referred to herein as second drive means, is controlled by unit 134 in a manner to be considered below.

In operation, a cart to be washed, such as cart 12, is moved through entrance 42 onto platform 52, and placed centrally thereon at the washing station within the chamber. Preferably exit door 50 is closed while the cart is being moved into the chamber to prevent contamination of the exit side of the apparatus. Entrance door 46 is then closed and the control unit in the apparatus is signaled to start a cart-washing operation. Where the apparatus is to be used in washing an open-side cart, such as cart 12, control unit 134 is set in what will be referred to as mode A. If the apparatus is to be used in washing an open-top cart of the type having an upper cut-out portion (as shown and described in U.S. Pat. No. 3,736,948), the control unit will be set in a mode B.

In mode A, the inner surfaces of an open-side cart, such as cart 12, are washed by the action of spray booms 66, 68. These booms are initially in "homing" positions shown in solid lines in FIG. 2, where their horizontally disposed segments extend substantially parallel to adjacent sidewall 24. Upon suitable actuation by control unit 134, pressurized wash water is supplied to pipe 80 to produce wash water sprays in the two booms, and compressed air is supplied to ram 88 to extend the ram, producing coordinated swinging of the two booms from their homing positions toward the associated positions indicated at 66A, 68B in FIGS. 2 and 4. The initial swinging movement of boom 68 produces a switching event in switch 122, through switch contact with arm 128, which "sets" unit 134 for counting additional switching events in switches 124, 126, as will be described.

Continued extension of ram 88, carries the two spray booms past the positions indicated at 66A and 68A toward the positions indicated at 66B and 68B, respectively. At the latter positions, arm 130 is positioned at 130B in FIG. 4 to produce a switching event in switch 126. Control unit 134, upon receiving this switching event, signals the valve device controlling the supply of pressurized air to ram 88. The flow of compressed air to the ram is reversed, causing the ram to retract. The two spray booms now reverse direction and begin clockwise movement in FIGS. 2 and 4 from positions 66B, 68B toward positions 66A, 68A, respectively. When the booms reach the latter positions, arm 130 is positioned at 130A in FIG. 4 to produce a switching event in switch 124 which, acting through unit 134, results in a direction reversal in ram 88, to move the booms again toward associated positions 66B, 68B.

The two booms thus oscillate between positions 66A, 68A and 66B, 68B under the control of unit 134 signalled alternately by switches 124, 126. The positional relationship between switches 124, 126 (seen in FIG. 4) produces an angular sweep of boom oscillation of about 90 degrees as indicated. This sweep, and the positions of the two booms in relation to the open side of a cart at the washing station is such as to ensure that the wash water spray from the two booms is directed against substantially the entire interior surfaces of the cart.

The recurrent switch-event sequences occurring in switches 124, 126 as boom 68 oscillates are counted in control unit 134. When a predetermined number of oscillations—e.g. 20 oscillations—have been counted, the control unit acts on the air-controlling valve device to cause ram 88 to retract fully to move the two booms toward their homing positions. The homing positions, which are angularly spaced from associated position 66A, 68A by about 45 degrees, are sensed by a switching event in switch 122 as arm 128 contacts that switch.

Following the just-described washing cycle, the supply of pressurized wash water is switched from booms 66, 68 to booms 138, 140 by a suitable valving device acted upon by signaling from control unit 134. With boom 140 maintained in its raised, horizontally disposed position, motor 152 is activated, also by suitable signaling from control unit 134, to rotate booms 138, 140 to direct wash water spray against the outer side region of the cart. The control unit is programmed to produce a predetermined number of rotational "sweeps" of boom 138, after which motor 152 is switched off and the supply of pressurized wash water to the two booms is discontinued.

The inside of the washed cart may be partially or fully dried by supplying compressed air to the air nozzles in booms 66, 68, and swinging the two booms recurrently in the manner described above. The washed cart is discharged from the chamber following ram-operated opening of door 50, by actuating ram 62 to place the cart-supporting platform in the inclined position shown in FIG. 5. The cart rolls out of the chamber under the influence of gravity.

Where the apparatus is used for washing an open-top cart of the type having an upper cut-out portion, the control unit is set in mode B for producing a cart-washing operation like that described in above-cited U.S. Pat. No. 3,736,948. Briefly, after the cart has been placed at the washing station and the chamber doors have been closed and sealed, ram 150 is actuated to shift boom 140 from its raised position above the cart, through the cart's cut-out portion toward the boom's upright position, where a substantial lower portion of the boom is disposed within a central region of the cart interior. The nozzles in boom 140 now confront those in boom 138, wherein the forces of the water sprays from the two booms—which would otherwise act to move the cart within the chamber—are substantially self-canceling. After a predetermined number of rotations in the two booms, boom 140 is shifted through the cart's cut-out portion to its raised position and the cart is discharged from the chamber in the manner described above.

The advantages of the present invention can be appreciated from the foregoing. The apparatus is operable to wash different types of delivery carts which are commonly used in a hospital and other institutional-care settings. In particular, the apparatus is adapted for use in washing an open-side cart having side-accessible shelves and an open-top laundry delivery cart. The different washing cycles involved in each type of cart are set by a mode-selector switch in the apparatus control unit.

Where the apparatus is used in washing an open-side cart, a pair of oscillating spray booms are effective to direct pressurized water spray against substantially the entire inner surfaces of the cart to be washed. The booms are then placeable in inactive conditions while the outside of the cart is washed by rotating boom structure. The open-side cart is supported on platform 52 in a slightly tilted position which promotes drainage of wash water from the cart after the two washing cycles have ended. The interior surfaces of the cart can be fully or partially dried through the action of compressed airstreams applied to the interior cart surfaces by the swinging booms.

After a cart has been washed and dried in the apparatus, it can be discharged automatically, under the control of an operator positioned on the infeed side of the apparatus, or through the control unit, by the gravity-assisted off-feed mechanism described.

While a preferred embodiment of the present invention has been described herein, it will be apparent to those skilled in the art the various changes and modifications can be made without departing from the spirit of the invention.

It is claimed and desired to secure by Letters Patent:

1. Apparatus for washing a delivery cart of the type having an open side, said apparatus comprising
  - a chamber adapted to receive the cart at a washing station defined within the chamber,
  - first nozzle means mounted within said chamber comprising an elongate upright spray boom disposed adjacent a side of the chamber and having nozzle structure operable to direct spray water to one side of the boom and inward in the chamber, said spray boom being mounted for oscillatory movement by back and forth rotation of the boom about an upright axis to provide by such movement a generally fan-shaped discharge of spray water directed by said nozzle structure inward in the chamber,
  - means for supplying pressurized wash water to said first nozzle means,
  - first drive means mounted on said chamber connected to said first nozzle means for producing said oscillatory movement whereby said spray water is directed against inner cart surfaces to be washed, with the cart positioned at said station,
  - second nozzle means mounted within said chamber for movement in a path substantially encircling a cart at said station, means for supplying pressurized water to said second nozzle means, and second drive means mounted on said chamber connected to said second nozzle means for producing therein cart-encircling movement.

2. The apparatus of claim 1, wherein said first nozzle means comprises another elongate upright spray boom disposed adjacent the same side of the chamber as the first-mentioned boom and adjacent and laterally spaced along this side from the first-mentioned spray boom, said other spray boom having nozzle structure operable to direct spray water to one side of the boom and inward in the chamber, said other spray boom being mounted for oscillatory movement by back and forth rotation of the boom about an upright axis to provide by such movement a generally fan-shaped discharge of spray water directed by said nozzle structure inward in the chamber, the fanshaped discharge of said first-mentioned and said other spray boom overlapping.

3. The apparatus of claims 1 or 2 which further includes cycle control means actable on said first and second drive means to effect a predetermined number of oscillations in a spray boom of said first nozzle means, followed by a predetermined number of cart-encircling movements of said second nozzle means, respectively.

4. The apparatus of claim 1, wherein said washing station is defined by a platform having a track on which said cart is guided for movement through said chamber, and which further includes a platform raising means for raising said platform to produce tilting of said platform and gravity-assisted movement of a washed cart from said station out of said chamber.

5. Apparatus for washing a delivery cart of the type having an open side, said apparatus comprising a chamber having an entrance and an exit on opposite sides thereof, a platform having a track on which a cart is guided for movement through said chamber, from said entrance to said exit, said platform defining a washing station where the open side of the cart faces a side of the chamber, a pair of side-by-side, vertically disposed spray booms mounted within said chamber located adjacent a side of said chamber and laterally spaced from each other along said side, said booms being mounted for oscillatory movement by back and forth rotation of the booms about upright axes within defined swinging angles, said spray booms having nozzle structure operable to direct spray water to one side of the booms and inward in the chamber, oscillating movement of the spray booms producing fan-shaped discharges of spray water and said fan-shaped discharges of spray water overlapping, means for supplying pressurized wash water to said spray booms, drive means mounted on said chamber drivingly connected to said spray booms for producing therein coordinated oscillatory movement within said swinging angles, wherein said water sprays are directed against substantially the entire inner cart surfaces to be washed, with the cart positioned at said station, a rotary spray boom mounted within said chamber for rotation about a cart at said station, means for supplying pressurized wash water to said rotary spray boom to produce therefrom a wash water spray directed toward the outer surface of a cart at said station, second drive means mounted on said chamber connected to said rotary spray boom for producing rotational movement thereof, wherein the water spray therefrom is directed against substantially the entire outer side surface of the cart positioned at said station, and control means operatively connected to said first and second drive means to effect a predetermined number of oscillations of said two spray booms, and a predetermined number of rotations of said rotary spray boom.

6. Apparatus for washing a delivery cart of the type having an open side, said apparatus comprising a chamber adapted to receive the cart and means forming a washing station where the cart resides during washing within the chamber, first nozzle means mounted within said chamber comprising an elongate upright spray boom disposed adjacent a side of the chamber and having nozzle structure operable to direct spray water to one side of the boom and inward in the chamber toward said washing station, said spray boom being mounted for oscillatory movement by back and forth rotation of the boom about an upright axis to provide by such movement a generally fan-shaped discharge of spray water directed by said nozzle structure inward in the chamber and toward said washing station, means for supplying pressurized wash water to said first nozzle means, first drive means connected to said first nozzle means for producing said oscillatory movement, second nozzle means mounted within said chamber comprising another elongate upright spray boom disposed adjacent a side the chamber opposite the side where the first-mentioned spray boom is located, said other spray boom having nozzle structure operable to direct spray water to one side of the boom and inward in the chamber toward said washing station, said other spray boom of said second nozzle means being mounted for movement in an arcuate path which path extends about the washing station, said nozzle structure of said other spray boom during movement in such arcuate path generally facing the center of said washing station, means for supplying pressurized wash water to said second nozzle means, and second drive means connected to said second nozzle means for producing movement of said other boom in said arcuate path.

7. The apparatus of claim 6, wherein said first nozzle means comprises a third elongate upright spray boom disposed adjacent a side of the chamber and the first-mentioned spray boom and adjacent and laterally spaced along this side from the first-mentioned boom, said third spray boom having nozzle structure operable to direct spray water to one side of the boom and inward in the chamber, said third spray boom being mounted for oscillatory movement by back and forth rotation of the boom about an upright axis to provide by such movement a generally fan-shaped discharge of spray water directed by said nozzle structure inward in the chamber, the fan-shaped discharge of said first-mentioned and said third spray boom overlapping.

8. The apparatus of claim 6, wherein said washing station is defined by a platform having a track on which said cart is guided for movement through said chamber, and which further includes a platform raising means for raising said platform to produce tilting of said platform and gravity-assisted movement of a washed cart from said station out of said chamber.

* * * * *